A. B. HULSEBOS AND G. DEN BESTEN.
AUTOMATICALLY RELEASING COUPLING.
APPLICATION FILED APR. 2, 1920.
1,384,195. Patented July 12, 1921.
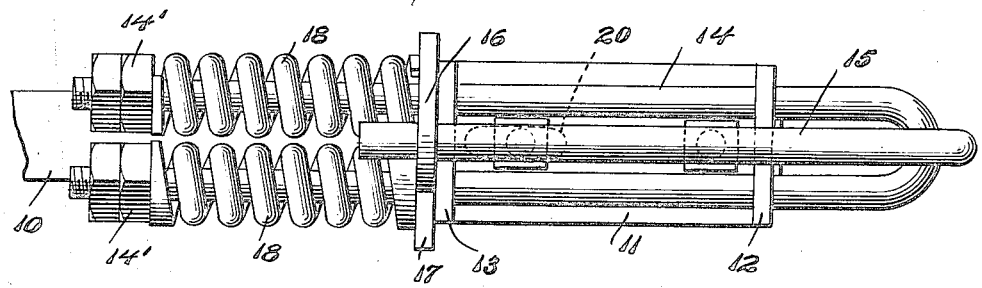
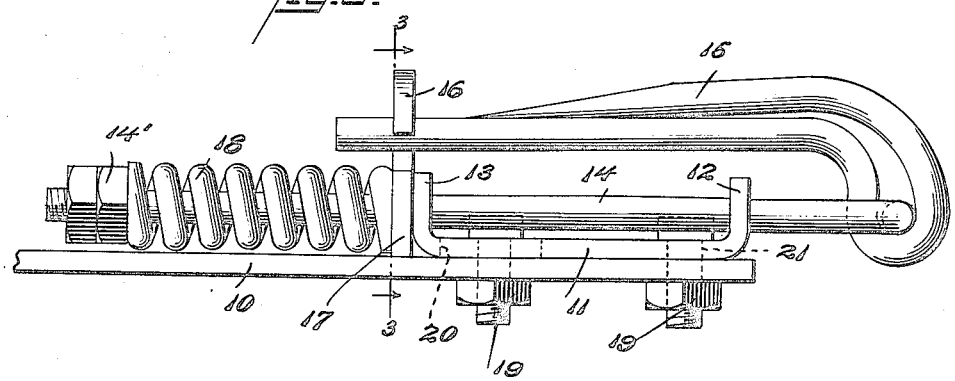
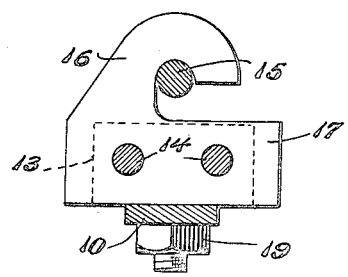

UNITED STATES PATENT OFFICE.

ALBERT B. HULSEBOS AND GERRIT DEN BESTEN, OF CORSICA, SOUTH DAKOTA, ASSIGNORS TO SAFETY RELEASE CLEVIS COMPANY, OF CORSICA, SOUTH DAKOTA, A PARTNERSHIP CONSISTING OF ALBERT A. HULSEBOS, GERRIT DEN BESTEN, HENRY KETEL, AND H. N. WAITE.

AUTOMATICALLY-RELEASING COUPLING.

1,384,195.     Specification of Letters Patent.     Patented July 12, 1921.

Application filed April 2, 1920. Serial No. 370,697.

*To all whom it may concern:*

Be it known that we, ALBERT B. HULSEBOS and GERRIT DEN BESTEN, citizens of the United States, and residing at Corsica, Douglas county, State of South Dakota, respectively, have invented certain new and useful Improvements in Automatically-Releasing Couplings, of which the following is a specification.

The present invention relates to couplings of the type adapted to transmit a pull, and more particularly to releasable couplings adapted to be substituted for the usual clevis on agricultural or similar implements.

The principal objects of the invention are to provide a safety coupling which may be substituted for the usual clevis without increasing the length of the connections from the implement to the tractor or animals pulling the implement; to provide a releasable coupling which will permit the tractor to back up the implement with a minimum of lost motion in the connections; to provide a coupling adapted for connection to present types of implements or new types; to provide a coupling which is dependable and operative without deformation or any substantial wear; to provide a coupling which is designed for manufacture at a low cost; and generally to provide an improved coupling of the type mentioned. Other objects and features of novelty will be apparent from the description taken in connection with the drawings in which;

Figure 1 is a top plan view of the coupling constructed in accordance with the present invention as applied to the end of a plow hitchbar;

Fig. 2 is a side elevation of the same; and

Fig. 3 is a section on line 3—3 of Fig. 2.

The member 10 in the drawings represents the forward end of the implement hitch which comprises in the present instance, a metal bar or plate, but which may be of any material, size or shape, the releasable coupling herein described not being limited in its use but applicable to farm implements of all kinds, or in fact any form of draft appliance.

The coupling itself comprises a metal plate 11 having front and rear upturned flanges 12 and 13 respectively provided with axially alined openings constituting bearings through which the legs of the U-shaped draft bolt 14 extend and in which they make a sliding fit. Pivotally mounted on the forward end of bolt 14 is the arm 15, between which and the forward end of the bolt 14 a link or other element connected to the tractor or swingletree may be confined. As shown in the drawings, the rearwardly extending arm has its end hooked under a catch 16 projecting upwardly from a plate 17 which is provided with openings to receive the legs of bolt 14. The plate 17 with the catch 16 is designated a keeper.

The bolt 14 is normally held against forward movement by a pair of coiled springs 18 mounted on and concentric with the legs of the bolt, the rear ends of the springs abutting against adjusting and locking nuts 14' threaded on the legs of the bolt and the front ends of the springs bearing against the keeper, thus clamping the same against the rear flange 13 of plate 11.

The coupling is designed to be rigidly secured to any hitchbar 10 or equivalent part of the implement or tool to be hauled. Usually the hitch bars 10 of plows are formed with a plurality of spaced holes, two being shown in the drawings. The coupling plate 11 in the form shown is formed with two spaced apertures 20 and 21 adapted to register with the holes in the hitch bar, the bolts 19 passing through the registering holes and apertures securing the coupling to the implement. Preferably one of the apertures as 20 is in the form of a slot so as to allow for variations in the spacing of the holes in the hitch bar.

In the operation of the device a link or a similar element which is connected to the tractor, or to the harness if horses are used, is confined between the forward end of bolt 14 and the arm 15, in the usual manner. The springs are so adjusted that they will resist the forward movement of the bolt, in the ordinary operation of the device, with a force sufficient to prevent the pivoted arm from escaping from beneath the keeper 16. The adjustment of the springs is, however, such that when the plow or other implement being pulled strikes an obstacle, such as a root or rock, the springs will yield, allowing the draft bolt to be drawn forward to such an extent that the end of pivoted arm 15 will escape from the keeper 16. Thereupon the arm will swing instantly about the forward end of the draft bolt upon which it is pivoted, and release the link and thereby the connection between the tractor or draft animals and the implement or vehicle being drawn. This prevents injury to the draft appliance or animals, the vehicle or implement being drawn, and the connecting harness or mechanism.

It will be apparent from the above description that the releasable coupling disclosed is simple in construction, cheap and convenient to manufacture, and easy to install. The pivoted arm 15 consists preferably of a metal rod bent into proper shape and having its ends brazed together or welded; the draft bolt consists simply in a U-shaped rod with threaded ends; and the keeper comprises a single plate secured in place without bolts. The main frame or plate 11 is of the utmost simplicity, while at the same time providing a two-point bearing for each leg of the draft bolt, preventing them from spreading apart.

The arrangement of the parts of the coupling and its point of connection to the implement are such that the point of connection to the tractive agent is at the same distance from the implement as when the old style device is employed. Thus the overall length of the tractive connection is not increased with the present invention. This is a feature of considerable practical importance, especially when it is desired or necessary to back up the implement. With the present invention there is a minimum of lost motion in reversing from pulling to backing. Furthermore, the construction of the coupling is such that it affords a rigid abutment for backing. In this operation the U-bolt and hitching link are pushed backward until they are stopped by flange 12, and thus constitute a rigid abutment.

Although the coupling has been described in connection with the hitch bar of a plow, it is to be understood that the invention is not thus limited but includes modifications and changes which come within the scope of the appended claims.

Having thus described the invention what is claimed as new and desired to be secured by Letters Patent is:

1. In a device of the class described a member adapted to be secured to a vehicle or implement, a draft bolt, said member having two spaced bearings slidably carrying said bolt, a coiled spring operative at one end on said bolt and at the other on said member for resisting forward movement of the draft bolt, an arm pivoted to the forward end of the draft bolt, and a keeper for the arm held against displacement by said bolt and spring, substantially as set forth.

2. In a device of the class described a plate adapted to be secured to a vehicle or implement and having upwardly turned front and rear flanges provided with openings therein, the opening in the front flange being in axial alinement with the opening in the rear flange, a draft bolt extending through said openings and having a sliding fit therein, a spring for resisting forward movement of the draft bolt, an arm pivoted to the forward end of the draft bolt and a keeper for the arm clamped between the spring and the rear flange of said plate, substantially as set forth.

3. In a device of the class described, a plate adapted to be secured to a vehicle or implement and having upwardly turned front and rear flanges each provided with two openings, a U-shaped draft bolt having each leg extending through an opening in each flange and making a sliding fit therein, a spring mounted on each leg of said bolt for resisting forward movement thereof, an arm pivoted to the bolt at its forward end, and a keeper for the arm secured to the rear flange of said plate, substantially as set forth.

4. In a device of the class described a plate adapted to be secured to a vehicle or implement and having front and rear flanges with openings therein, a U-shaped draft bolt having legs extending through said openings and having a sliding fit therein, a coiled spring on each of said legs of the bolt in the rear of the rear flange of the plate for resisting forward movement of the bolt, an arm pivoted to the forward end of the draft bolt, and a keeper for the arm formed with openings slidably receiving the legs of the bolts, said keeper being clamped between said springs and the rear flange of said plate, substantially as set forth.

In testimony whereof we affix our signatures.

A. B. HULSEBOS.
GERRIT DEN BESTEN.